(12) United States Patent
Khan et al.

(10) Patent No.: US 10,277,388 B2
(45) Date of Patent: *Apr. 30, 2019

(54) PORTABLE MILLIMETER-WAVE COMMUNICATIONS DEVICE

(71) Applicant: Phazr, Inc., Allen, TX (US)

(72) Inventors: Farooq Khan, Allen, TX (US); Eran Pisek, Allen, TX (US); Khurram Muhammad, Fort Worth, TX (US); Robert Daniels, Austin, TX (US); Shadi Abu-Surra, Plano, TX (US); Oren Eliezer, Plano, TX (US); Sidharth Balasubramanian, Garland, TX (US); Rakesh Taori, McKinney, TX (US)

(73) Assignee: Phazr, Inc., Allen, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/844,563

(22) Filed: Dec. 17, 2017

(65) Prior Publication Data

US 2018/0109282 A1    Apr. 19, 2018

Related U.S. Application Data

(63) Continuation of application No. 15/458,884, filed on Mar. 14, 2017, now Pat. No. 9,876,525.

(60) Provisional application No. 62/384,064, filed on Sep. 6, 2016.

(51) Int. Cl.
    *H04B 1/40* (2015.01)
    *H04L 7/033* (2006.01)

(52) U.S. Cl.
    CPC ............ *H04L 7/0331* (2013.01); *H04B 1/40* (2013.01)

(58) Field of Classification Search
    CPC ...... H04B 1/401; H04B 1/3827; H04L 7/0331
    USPC .......................................................... 455/74
    See application file for complete search history.

(56) References Cited

U.S. PATENT DOCUMENTS

| | | | |
|---|---|---|---|
| 5,621,913 A * | 4/1997 | Tuttle | H02J 50/30 455/41.2 |
| 5,890,055 A * | 3/1999 | Chu | H04B 7/2606 455/16 |
| 9,660,345 B1 * | 5/2017 | Gu | H01Q 9/0407 |

* cited by examiner

Primary Examiner — Sanh D Phu
(74) Attorney, Agent, or Firm — Michael A. Rahman

(57) ABSTRACT

A portable millimeter-wave wireless communications device relies on millimeter-wave spectrum for wireless communications. The millimeter-wave device may be a smart-phone, a laptop computer or a tablet computer. The millimeter-wave device may be a module that is added to an existing portable device such as a smart-phone, a laptop computer or a tablet computer to provide millimeter-wave communications capability. The module may be incorporated into a protective encapsulating case of such portable devices.

17 Claims, 9 Drawing Sheets

PORTABLE MILLIMETER-WAVE COMMUNICATIONS DEVICE

RELATED APPLICATION

This application is a continuation of U.S. application Ser. No. 15/458,884 filed Mar. 14, 2017, which claims priority to U.S. Provisional Patent Application No. 62/384,064, filed Sep. 6, 2016, and entitled "A PORTABLE MILLIMETER-WAVE WIRELESS COMMUNICATIONS DEVICE" both of which are hereby incorporated by reference in their entirety.

BACKGROUND

The invention relates to wireless communications, and in particular to millimeter-wave wireless communication devices.

DESCRIPTION OF THE RELATED ART

Current wireless communication systems are based primarily on two standards: Wide area network (WAN) or cellular standards (e.g., Fourth Generation Long Term Evolution (4G LTE) system); and local area networks (LAN) standards (e.g., IEEE 802.11ac). Wireless LAN systems, hereafter to be referred to as "Wi-Fi", serve as wireless extensions of wired broadband systems and operate in either the license-exempt or the shared spectrum bands. The 4G LTE cellular systems provide wide area connectivity in the licensed spectrum bands, and rely on dedicated infrastructure such as cell towers and backhaul equipment to connect to the Internet.

As more users rely on the Internet to telecommute, communicate with friends and family, watch videos, listen to streamed music, and indulge into virtual/augmented reality experiences, the data traffic continues to grow exponentially. In order to address the continuously growing wireless capacity challenge, the next generation of LAN and WAN systems are expected to use wider bandwidths and higher carrier frequencies, primarily in the millimeter wave range, as listed in Table 1.

TABLE 1

Examples of millimeter-wave bands

| Bands [GHz] | Frequency [GHz] | Bandwidth [GHz] |
| --- | --- | --- |
| 24 GHz | 24.25-24.45 | 0.200 |
|  | 24.75-25.25 | 0.500 |
| 28 GHz/LMDS | 27.5-28.35 | 0.850 |
|  | 29.1-29.25 | 0.150 |
|  | 31-31.3 | 0.300 |
| 32 GHz | 31.8-33 | 1.200 |
| 37 GHz | 37.0-38.6 | 1.600 |
| 39 GHz | 38.6-40 | 1.400 |
| 42 GHz | 42.0-42.5 | 0.500 |
| 47 GHz | 47.2-50.2 | 3.000 |
| 50 GHz | 50.4-52.6 | 1.200 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

BRIEF SUMMARY OF THE INVENTION

Disclosed embodiments are directed to a portable millimeter-wave wireless communications device. In one aspect, the invention may be implemented as a smart-phone, a laptop computer or a tablet computer that relies on millimeter-wave spectrum for wireless communications. In another aspect, the invention may be implemented as a module that is added to an existing portable device such as a smart-phone, a laptop computer or a tablet computer to provide millimeter-wave communications capability. The module may be incorporated into a protective encapsulating case of such portable devices, and could include a battery that is separate from that of the portable device.

According to disclosed embodiments, a module is configured to convert a portable wireless communications device to a millimeter-wave wireless communications device. The module includes a plurality of millimeter-wave antennas configured to receive millimeter-wave signals and at least one low-noise amplifier (LNA) configured to amplify the received millimeter-wave signals. The module includes a down-conversion circuit configured to down-convert the amplified millimeter-wave signals to sub-6 GHz signals and a plurality of coupling antennas configured to couple the down-converted sub-6 GHz signals to a plurality of second antennas inside the portable communications device. The module includes at least one switch which routes the coupled down-converted sub-6 GHz signals to a WLAN processing circuit for processing.

According to disclosed embodiments, when the wireless communications device is in a receive mode, the switch routes the down-converted sub-6 GHz signals to the WLAN circuit, and when the wireless communications device is in a transmit mode, the switch electrically disconnects the second antennas from the WLAN circuit.

According to disclosed embodiments, a portable millimeter-wave wireless communications device is configured to transmit uplink signals at a sub-6 GHz band and receive downlink signals at a millimeter-wave band, wherein the millimeter-wave band is widely separated from the sub-6 GHz band. The device includes a plurality of millimeter-wave antennas configured to receive millimeter-wave signals and at least one low-noise amplifier (LNA) configured to amplify the received millimeter-wave signals. The device includes a down-conversion circuit configured to down-convert the amplified millimeter-wave signals to sub-6 GHz signals. The device includes a switch configured to route the down-converted signals to a sub-6 GHz processing circuit when the device is in a receive mode and configured to route the down-converted signals to at least one sub-6 GHz antenna when the device is in a transmit mode.

DETAILED DESCRIPTION

In one aspect, some disclosed embodiments are directed to a portable communications device that relies on millimeter-wave spectrum for wireless communications. The portable communications device may, for example, be a smart-phone, a laptop computer, or a tablet computer. In another aspect, disclosed embodiments may be realized as a module that is added to a conventional portable communications device such as a smart-phone, a tablet, or a laptop computer. The add-on module converts a conventional communications device to a millimeter-wave communications device. The module may be incorporated into a protective encapsulating case commonly used for conventional portable devices. The module may be powered by a battery that is separate from that of the portable device or may rely on the existing battery of the portable device.

According to disclosed embodiments, radio spectrum below 6 GHz is used in the uplink relying on the existing hardware within the portable device, and higher millimeter-wave spectrum is used in the downlink based on the dedicated circuitry in the add-on module.

Figure 1:
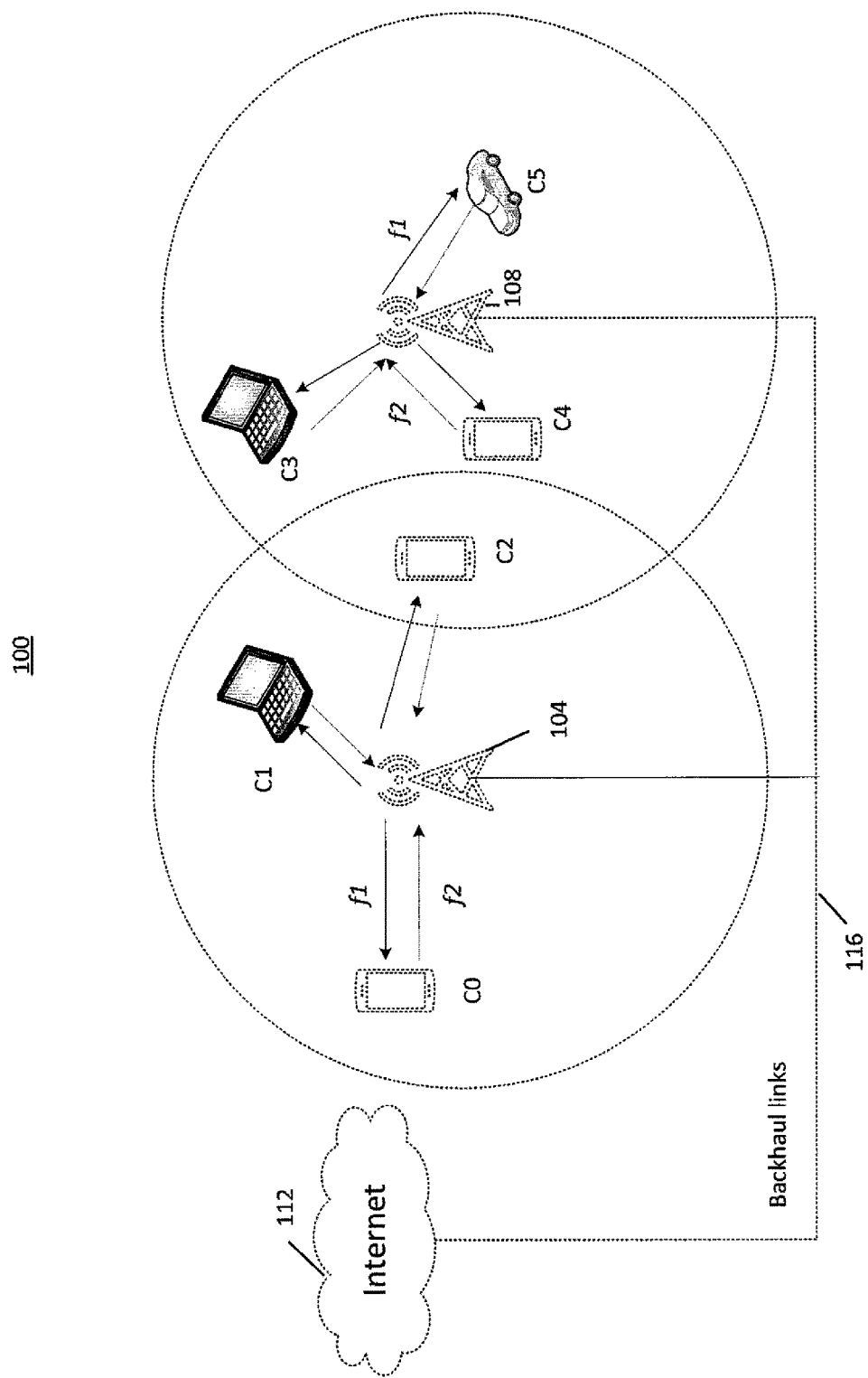
FIG. 1 illustrates a wireless network in accordance with disclosed embodiments.

FIG. 1 illustrates an exemplary wireless network 100 in accordance with disclosed embodiments. Wireless network 100 uses frequency $f_1$ for the downlink in a licensed millimeter-wave band, such as, for example, the 28, 37 or 39 GHz bands, and frequency $f_2$ for the uplink in a sub-6 GHz frequency band such as, for example, the 5 GHz unlicensed ISM or UNII bands.

Wireless network 100 includes base stations or access points 104 and 108 connected to the Internet 112 through high-speed wired links 116. The wired links 116 may, for example, include optical fiber links (e.g., 10-100 Gb/s) or other means (shown in FIG. 1 as "Backhaul links"). Access point 104 provides services to portable communication devices C0, C1 and C2 on a first frequency $f_1$ in the licensed millimeter-wave bands, such as the 28, 37 and 39 GHz bands, on the downlink, while a second frequency $f_2$ in the unlicensed sub 6 GHz bands is used on the uplink. Similarly, the access point 108 provides services to portable communication devices C3, C4 and a vehicle C5 on a first frequency $f_1$ in the licensed millimeter-wave bands, such as the 28, 37 and 39 GHz bands, on the downlink, while a second frequency $f_2$ in the unlicensed sub 6 GHz band is used on the uplink.

In one aspect of the invention, access point 104 provides for a downlink on a first frequency $f_1$ in the licensed millimeter-wave bands, such as the 28, 37 and 39 GHz bands, and a second frequency $f_2$ in the unlicensed sub 6 GHz band serves for the uplink, while access point 108 provides downlink on a first frequency $f_1$ at the licensed millimeter-wave bands, such as 28, 37 and 39 GHz bands, and a third frequency $f_3$ in the unlicensed 5 GHz band serves for the uplink. It should be noted that such use of millimeter-wave spectrum, wherein the same frequency $f_1$ may be used by multiple links operating simultaneously in proximity to one another, is made possible through the employment of narrow-beam antennas and, in particular, electronically-steerable phased-arrays.

In another aspect of the invention, wireless access point 104 provides downlink on a first frequency $f_1$ in the licensed millimeter-wave bands, such as the 28, 37 and 39 GHz bands, and a second frequency $f_2$ in the unlicensed 5 GHz band is used on the uplink, while wireless access point 108 provides for a downlink on a third frequency $f_3$ in the licensed millimeter-wave bands, such as 28, 37 and 39 GHz bands, and a fourth frequency $f_4$ in the unlicensed 5 GHz band serves for the uplink.

Figure 2:
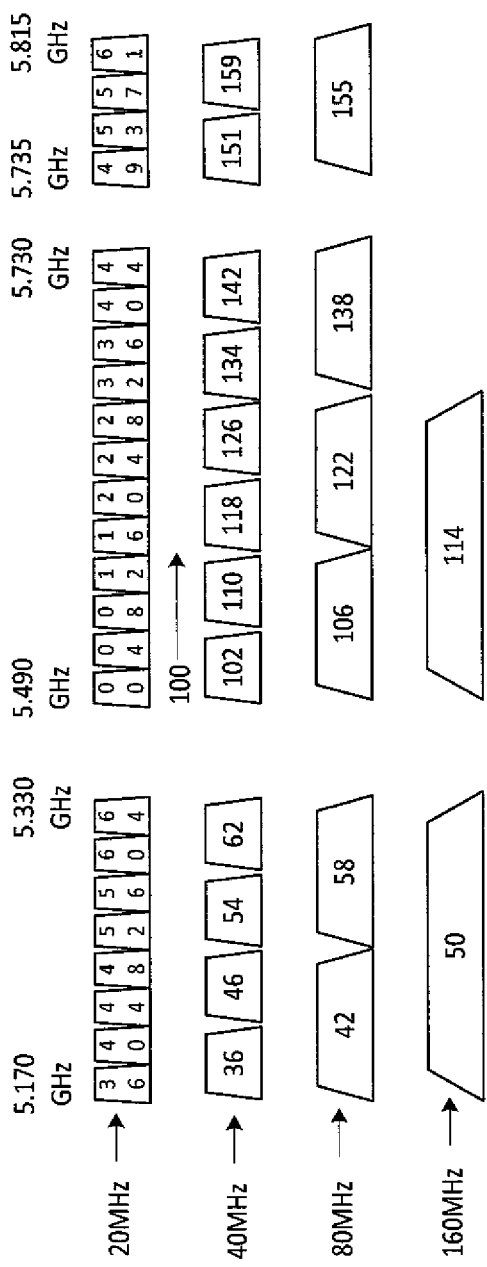
FIG. 2 illustrates 5 GHz frequency bands.

According to some embodiments, the first frequency $f_1$ used for the downlink is one of the milliliter-wave frequencies in the 28 GHz licensed band depicted in Table 1, while the second frequency $f_2$, used for the uplink can either be in the sub-6 GHz bands (e.g., one of the 5 GHz frequencies, as depicted in FIG. 2, or is in one of the millimeter-wave bands listed in Table 1. It shall be assumed generally that the first frequency used in the downlink is one of the millimeter wave bands shown in Table 1 and the second frequency used in the uplink is 5 GHz unlicensed band depicted in FIG. 2.

Figure 3:
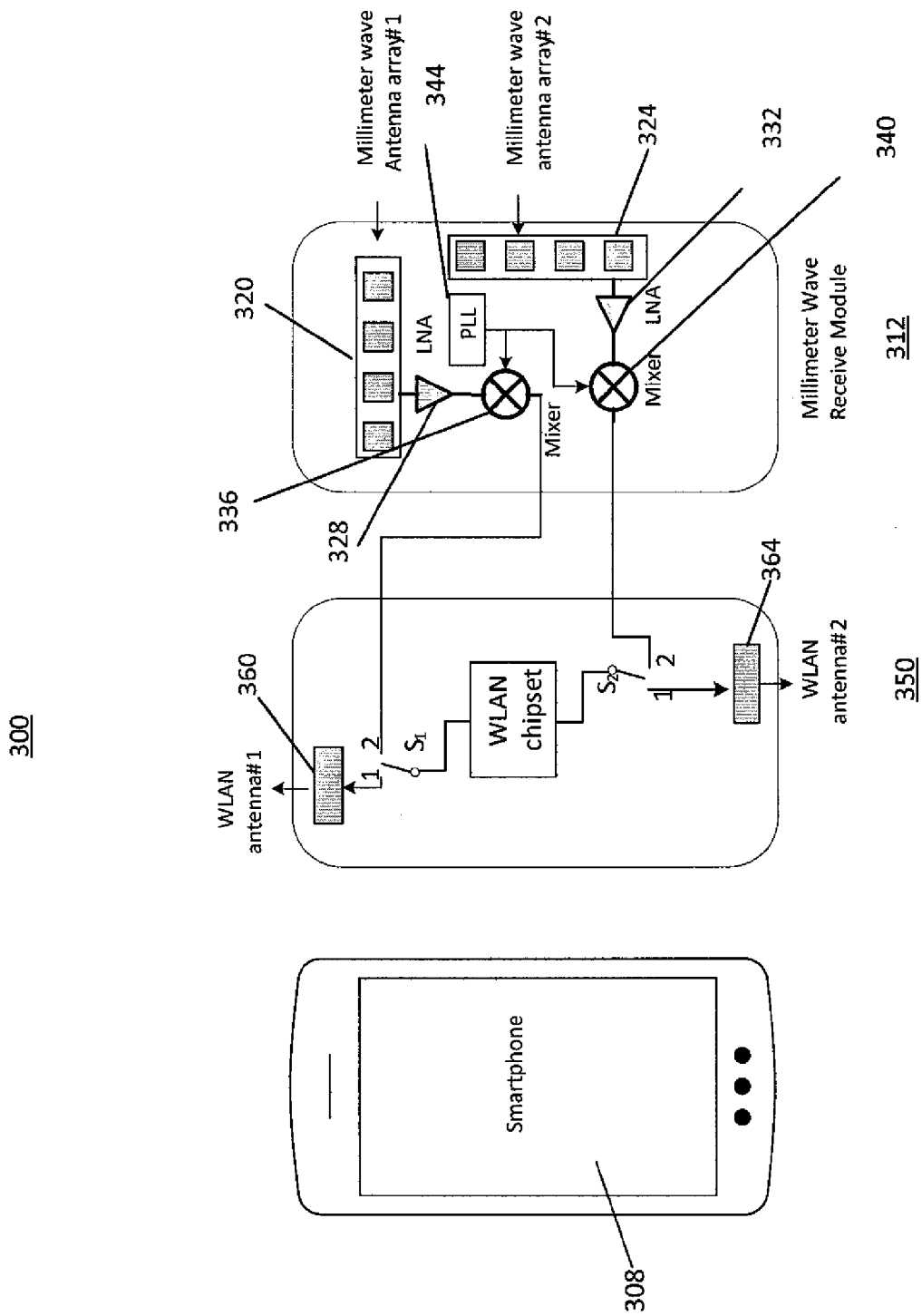
FIG. 3A-3C illustrate various sections of a wireless communications device in accordance with disclosed embodiments.

FIG. 3A-3C illustrate various sections of a wireless communication device in accordance with disclosed embodiments. The wireless communication device is configured to receive at frequency $f_1$ in one of the licensed millimeter-wave (mmW) bands on the downlink, such as the 28, 37 and 39 GHz bands, and to transmit at frequency $f_2$ in the unlicensed sub-6 GHz band on the uplink.

FIG. 3A shows a top view of the wireless communication device including display screen 308. The wireless communications device includes millimeter wave receive module 312 shown in FIG. 3B and WLAN module 350 shown in FIG. 3C.

Referring to FIG. 3B, millimeter wave receive module 312 includes millimeter wave (mmW) antenna arrays 320 and 324 configured to receive mmW signals. The received mmW signals are amplified by mmW low-noise-amplifiers (LNA) 328 and 332. The amplified mmW signals are down-converted to sub-6 GHz band by a pair of mixers 336 and 340 driven by phase-locked-loop (PLL) 344.

Referring to FIG. 3C, the 5 GHz signals from mixers 336 and 340 are routed through switches $S_1$ and $S_2$ to WLAN module 350 for processing. The switches S1 and S2 are controlled such that when it is in transmit mode, the switch is in position 1 (connected to WLAN antennas 360 and 364), and when it is in receive mode, the switch is in position 2 (connected to mmW module 312). Thus, the wireless communication device uses switches S1 and S2 to receive at frequency $f_1$ in the licensed millimeter-wave bands in the downlink by switching to mmW receiver module 312, and transmit at frequency $f_2$ in the unlicensed sub 6 GHz band on the uplink by switching to antennas 360 and 364.

Since the isolation between switch positions 1 and 2 is limited, the amplified and down-converted sub-6 GHz received signal from the mmW antennas 320 and 324 can couple to the sub-6 GHz transmit antennas 360 and 364 respectively degrading the out of band emission at sub-6 GHz band. According to some disclosed embodiments, when the switch is in position 1, a control signal from the WLAN module 350 is used to disable or power down LNAs 328 and 332 either through an enable input or by turning off the power supply to LNAs 328 and 332 to avoid the out of band emission at sub-6 GHz band.

According to some disclosed embodiments, a third switch on the mmW receiver paths after mixers 336 and 340 is opened when the main switch is in position 1. According to yet other disclosed embodiments, the output of the PLL is disabled in the mmw module such that there is no down-conversion from the mmW input to WLAN band.

Figure 4:
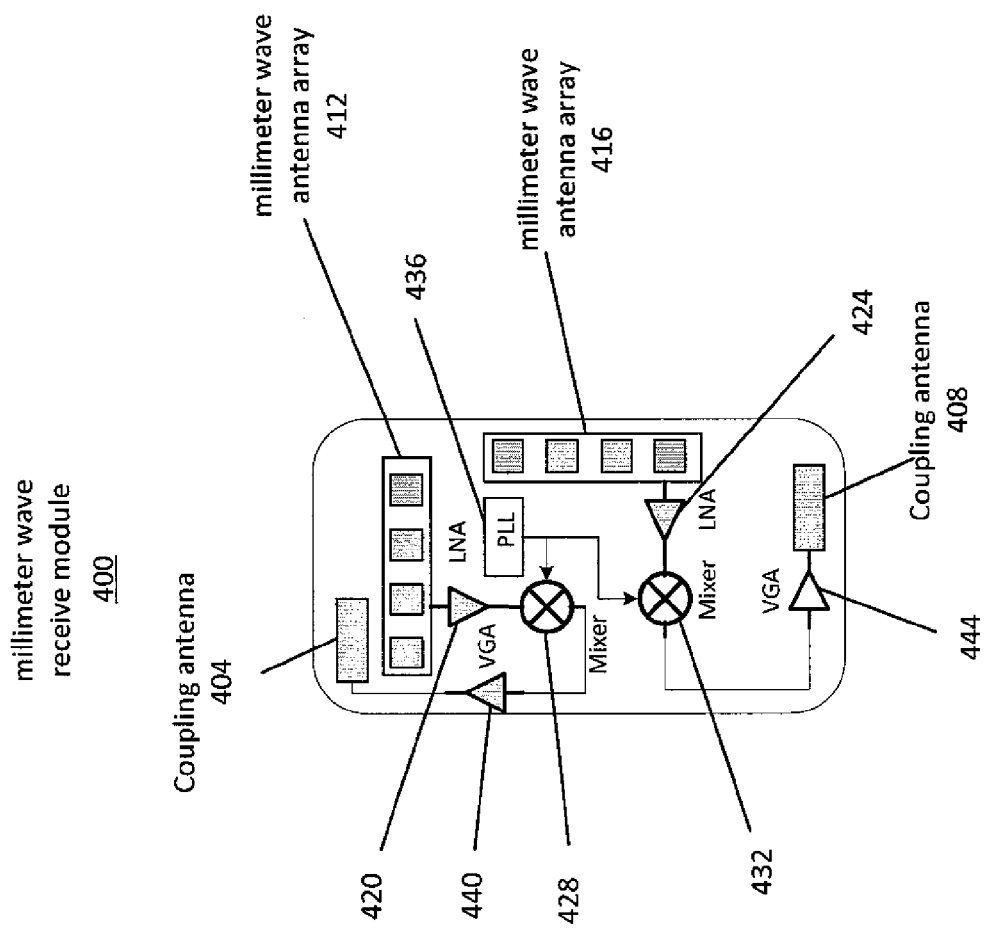
FIG. 4 illustrates a millimeter-wave module in accordance with disclosed embodiments.

FIG. 4 illustrates millimeter wave module 400 in accordance with disclosed embodiments. Receive module 400 receives at frequency $f_1$ at the licensed mmW bands such as, for example, 28, 37 and 39 GHz bands, using coupling antennas 404 and 408, and transmits at frequency $f_2$ in unlicensed sub-6 GHz band on the uplink. Coupling antennas 404 and 408 operate according to the principle of mutual inductive coupling to transfer signals between the coupling antennas 404 and 408 and the WLAN sub-6 GHz antennas 360 and 364. The over-the-air received signals at frequency $f_1$ at the licensed mmW bands such as, for example, 28, 37 and 39 GHz bands at mmW antenna array 412 and at mmW antenna array 416 are amplified by mmW low-noise-amplifiers (LNAs) 420 and 424.

The amplified mmW signals are down-converted to 5 GHz band by mixers 428 and 432 driven by phase-locked-loop (PLL) 436. A filter such as a coupled line filter (not shown in FIG. 4) may precede the mixer to suppress the image frequencies at 18, 27 and 29 GHz or 38, 47 and 49 GHz, as determined by a local oscillator (low-side or high-side injection) frequency. Alternatively, in the absence of such interferers, the filter can be removed entirely to facilitate reduction in insertion losses and in implementation dimensions. The resulting down-converted signals at 5 GHz can optionally be amplified by variable gain amplifiers (VGA) 440 and 444. These amplified 5 GHz frequency signals are coupled to WLAN/WiFi antennas using coupling antennas 404 and 408 and the WLAN sub-6 GHz antennas 360 and 364. A WiFi transceiver (shown in FIG. 3C) processes these signals as if they were directly received over the air at 5 GHz. The gain setting for the VGAs can be controlled based on the power level of the signals at the output of the mixers or via external control based on the signal level sensed by the WiFi receiver (not shown in FIG. 4). Fixed gain amplifiers may also be used as an alternative to the VGAs.

Referring to FIG. 4, millimeter wave module 400 may be disabled when the WLAN transceiver (shown in FIG. 3C) is in transmit mode. Since the signal received in the mmW band is amplified and mixed down to the unlicensed band and radiated through the coupling antenna, degrading out of band emissions may emanate from the portable device. According to disclosed embodiments, a TX/RX switch control signal from the WLAN transceiver may be used to power down the mmW signal path while the WLAN transceiver is in a transmit mode. An additional switch in the mmW path may be used or the LNA may be turned off.

According to disclosed embodiments, the coupling can be kept weak such that the performance of the main WLAN antennas on the smartphones are not noticeably degraded by making the coupling antenna small such as to modify the radiation characteristics of the WLAN antennas only slightly. Potential changes in the impedance of the WLAN antennas may be compensated for by an antenna tuner that is typically present in the cellphone to determine the best values of the tuning elements in the tuner network that would bring the composite WLAN and coupling antennas to the desired impendence value.

Figure 5:
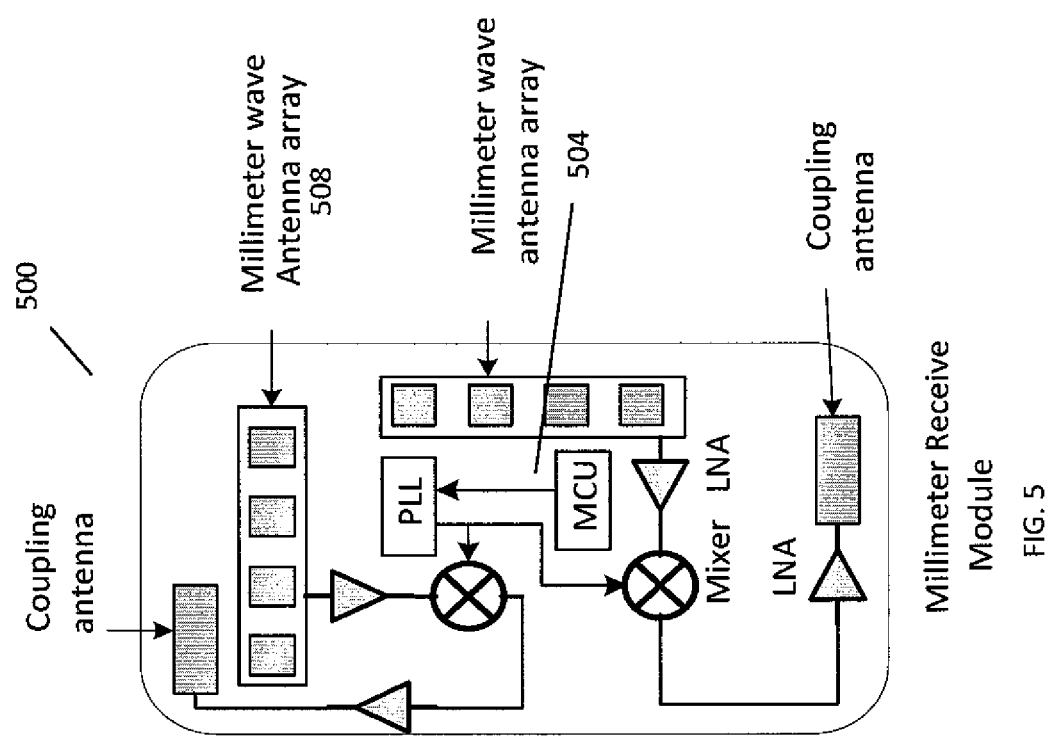
FIGS. 5, 6, 7A-7B, 8, 9A and 9B illustrate millimeter-wave modules in accordance with other disclosed embodiments.

According to yet another disclosed embodiment illustrated in FIG. 5, in millimeter wave module 500 microcontroller unit (MCU) 504 controls PLL 508 to set the appropriate frequency for converting between 28 and 5 GHz. MCU 504 also powers up/down sequence and a phase shifter inputs for beamforming.

Figure 6:
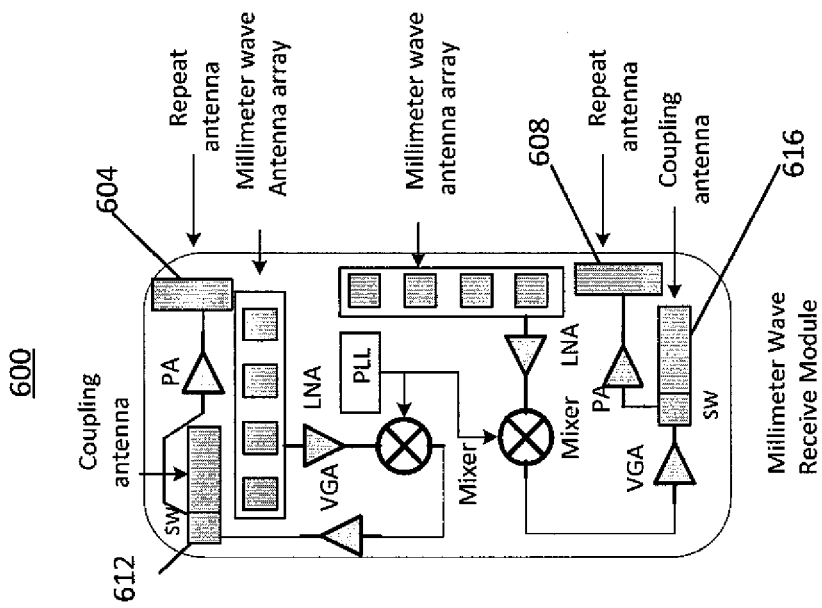

In yet another embodiment shown in FIG. 6, mmW module 600 also transmits at frequency $f_2$ in the unlicensed 5 GHz band. In this embodiment, mmW module 600 also acts as a repeater at frequency $f_2$ in the unlicensed 5 GHz band in the uplink. Referring to FIG. 6, module 600 receives at frequency $f_1$ in one of the licensed mmW bands, such as the 28, 37 and 39 GHz bands, and transmits at frequency $f_2$ in the unlicensed sub-6 GHz band in the uplink direction. MmW module 600 then receives at $f_2$ in the uplink and amplifies it and transmits through repeater antennas 604 and 608. Coupling antennas 612 and 616 are switched between receiving the signal from module 600 in the uplink and transmitting the signal to module 600 in the downlink. The switching control can either come from module 600 based on a control signal from the WLAN transceiver (not shown in FIG. 6) or may be based on direction-detection in mmW module 600.

According to disclosed embodiments, switch control is used to turn off the voltage supply to the LNA (or to disable it by a control input in the mmW module in the TX mode or by opening a switch in its path such that the down converted signal from the mmw band does not spuriously radiate through the TX path in the TX mode, thereby degrading the out-of-band emission performance.

Figure 7A:
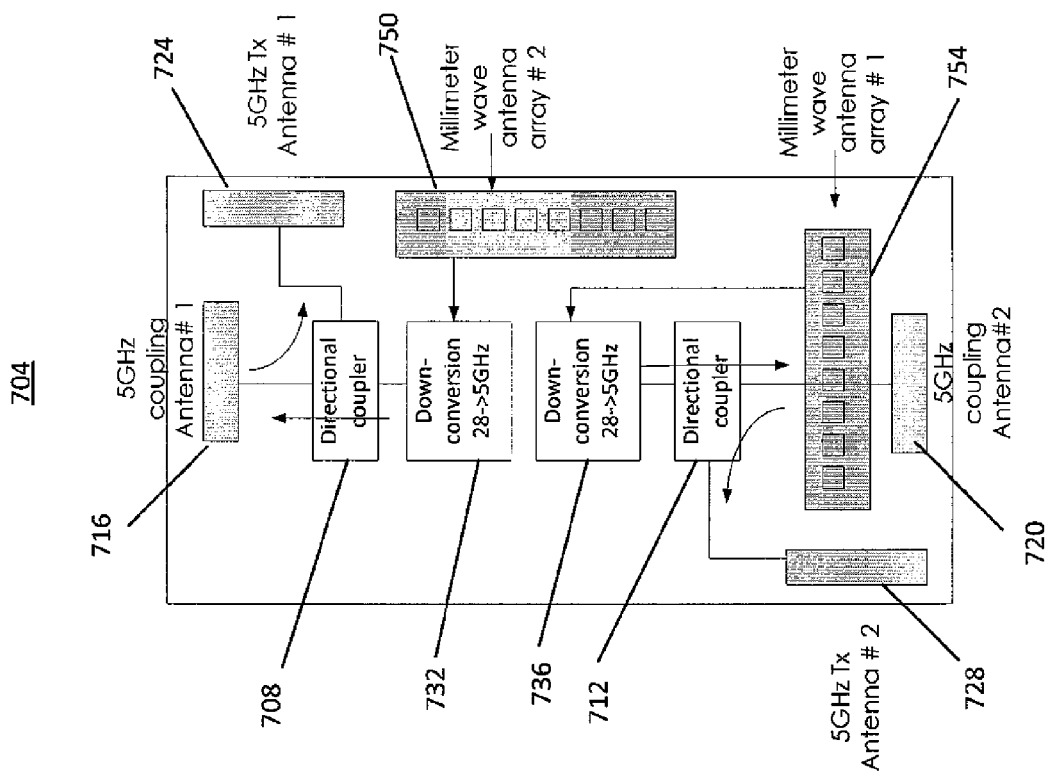
Figure 7B:
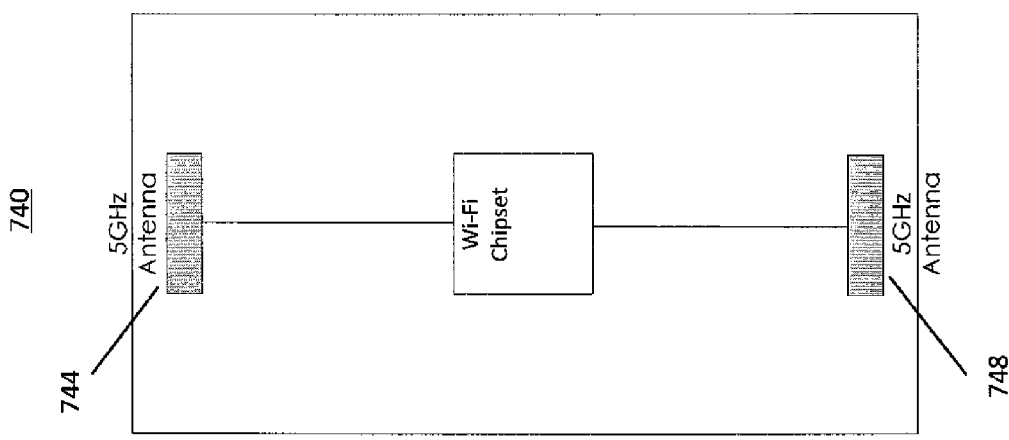

FIGS. 7A and 7B illustrate yet another embodiment of the invention. FIG. 7A illustrates mmW module 704 comprising circulators (referred to as "directional couplers") 708 and 712 used to decouple the transmit and receive signals in mmW module 704. FIG. 7B shows WLAN module 740 comprising WLAN antennas 744 and 748. In operation, 5 GHz transmit signals from WLAN antennas 744 and 748 are captured by mmW module 704 using 5 GHz coupling antennas 716 and 720 and the captured signals are retransmitted by 5 GHz transmit antennas 724 and 728. Directional couplers 708 and 712 ensure that the captured 5 GHz signals do not leak through the mmW circuitry to the 5 GHz down-conversion circuitry 732 and 736.

The received mmW signals at millimeter wave antenna arrays 750 and 754 are down-converted from mmW to 5 GHz by the down-conversion circuitry 732 and 736 and forwarded to the 5 GHz coupling antennas 716 and 720. The 5 GHz coupling antennas 716 and 720 then transmit these signals towards the WLAN 5 GHz antennas 716 and 720. These signals are then processed as if they were received as WLAN 5 GHz signals from over-the-air. Out of band spurious emissions can be reduced by turning off the mmW RX path during TX mode.

Figure 8:
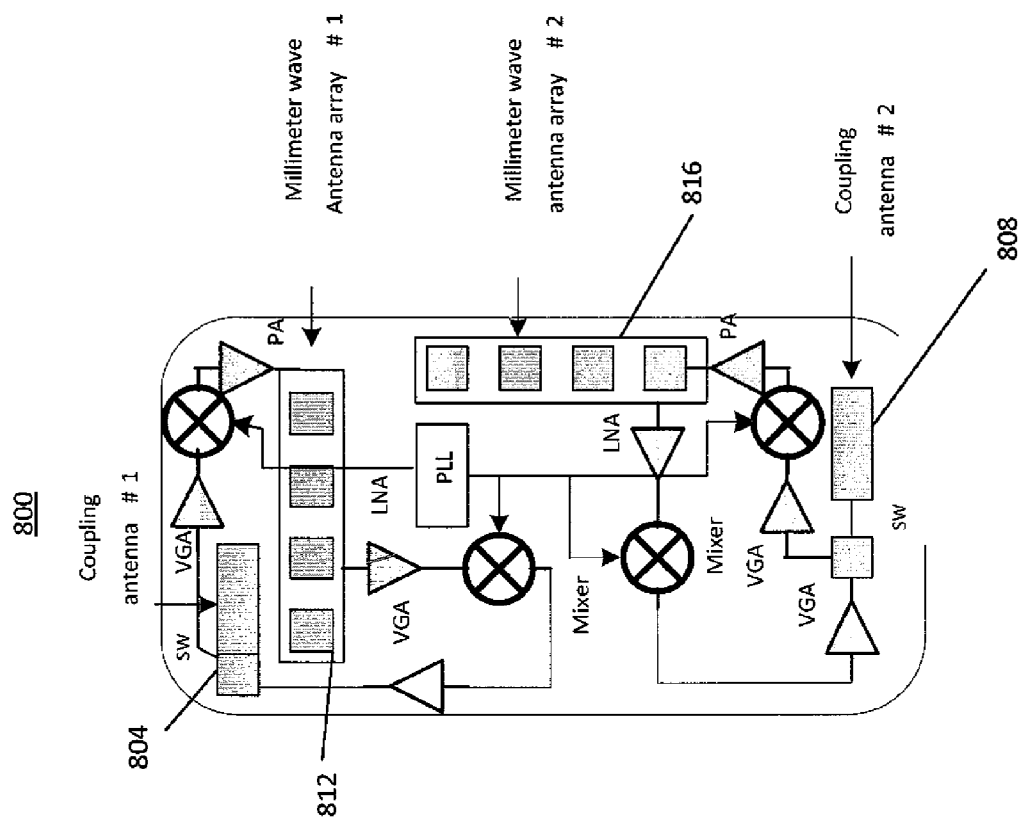

In another embodiment of the invention, a smartphone transmits at frequency $f_1$ in the licensed band in the uplink. FIG. 8 illustrates a millimeter wave module 800 inside a smartphone. The mmW module 800 receives at frequency $f_1$ in one of the licensed mmW bands, such as the 28, 37 and 39 GHz bands, and also transmits at frequency $f_1$ in the uplink. The mmW module 800 then receives at $f_2$ in the uplink from the coupling antennas 804 and 808 and amplifies it and up-converts it to mmW frequency $f_1$ and transmits it through the mmW antennas 812 and 816. The mmW antennas 812 and 816 are shared between the transmitter and receiver and switched through the same control for the coupling antennas 804 and 808.

In another embodiment of the invention, the uplink and downlink mmW antennas are separated, thus eliminating the need for switching the mmW transmitting signal and receiving signal to/from the antennas. In such embodiment, the uplink and downlink mmW frequencies can be different, i.e.

$f_1$ and $f'_1$. The PLL is switched quickly between TX and RX to center the local oscillator for transmitting at $f_1$ and receiving at $f'_1$.

Figures 9A, 9B:
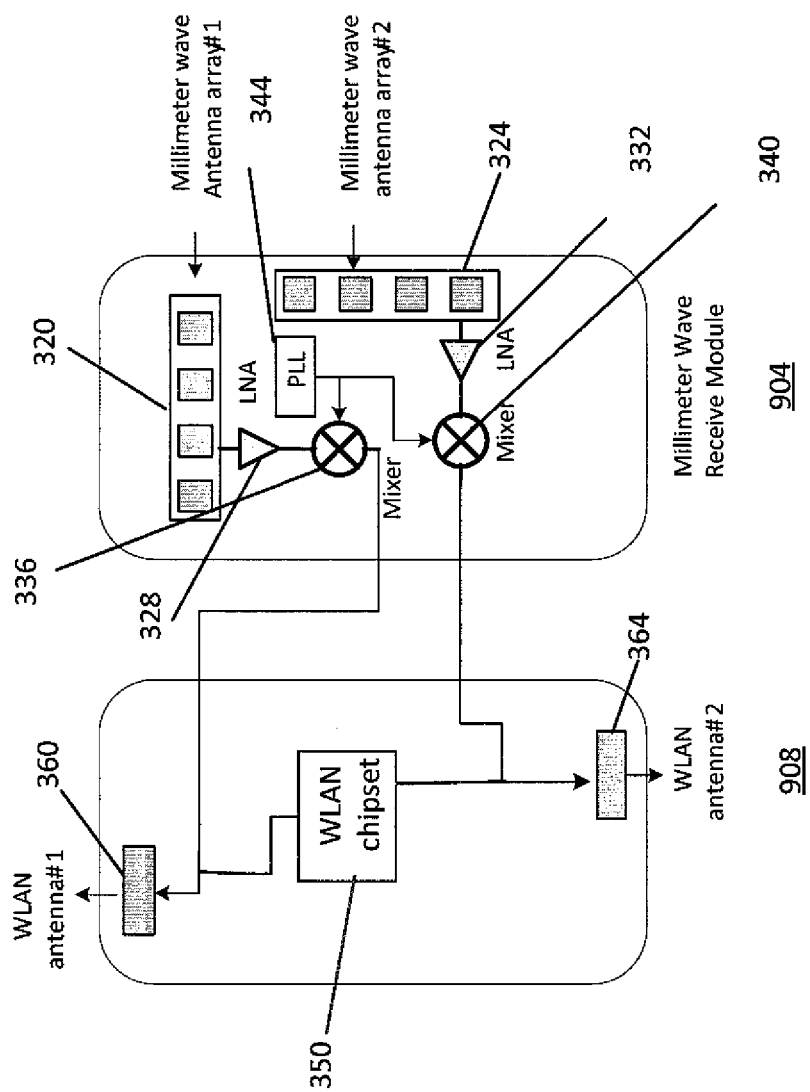

FIGS. 9A and 9B illustrate yet an embodiment, which is a variation of the embodiment previously illustrated in FIGS. 3A, 3B and 3C. Referring to FIG. 9A, millimeter wave receive module 312 includes millimeter wave (mmW) antenna arrays 320 and 324 configured to receive mmW signals. The received mmW signals are amplified by mmW low-noise-amplifiers (LNA) 328 and 332. The amplified mmW signals are down-converted to sub-6 GHz band by a pair of mixers 336 and 340 driven by phase-locked-loop (PLL) 344. Referring to FIG. 9B, the sub-6 GHz signals from mixers 336 and 340 are routed directly to sub-6 GHz processing circuit 350. In contrast to the embodiment illustrated in FIGS. 3A, 3B and 3C, in this embodiment of FIGS. 9A and 9B, the sub-6 GHz signals from mixers 336 and 340 are routed to processing circuit 350 without the aid of switches. The sub-6 GHz processing circuit may, for example, be a WLAN chipset.

Although embodiments of the invention have been described for implementation in a smartphone, it will be appreciated by those skilled in the art that the principles of the invention also apply to other portable devices such as Tablets and Laptops etc.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Those skilled in the art to which this application relates will appreciate that other and further additions, deletions, substitutions and modifications may be made to the described embodiments.

The invention claimed is:

1. A wireless communications device comprising:
   a plurality of millimeter wave band antennas configured to receive millimeter wave band downlink signals when the communications device is in a receive mode;
   at least one low-noise amplifier (LNA) configured to amplify the millimeter wave band downlink signals;
   a down conversion circuit configured to down-convert the amplified millimeter wave band downlink signals to sub-6 GHz signals;
   a sub-6 GHz processing circuit configured to process the down converted sub-6 GHz signals; and
   a plurality of sub-6 GHz antennas configured to transmit sub-6 GHz band uplink signals when the communications device is in a transmit mode, wherein the millimeter wave band downlink signals are separated from the sub-6 GHz signals by at least 10 GHz.

2. The wireless communication device of claim 1, wherein the millimeter wave signals have frequencies of 24 GHz or higher.

3. The wireless communication device of claim 1, wherein the down conversion circuit comprises at least one local oscillator driven by a phase locked loop (PLL).

4. The wireless communication device of claim 1, wherein the LNA is disabled when the device is in the transmit mode.

5. The wireless communication device of claim 1, further comprising a switch operable to route the down-converted sub-6 GHz signals to the sub-6 GHz processing circuit when the device is in the receive mode.

6. A millimeter wave wireless communications device configured to transmit uplink signals at a sub-6 GHz band and receive downlink signals at a millimeter wave band, comprising:
   a plurality of millimeter wave band antennas configured to receive millimeter wave downlink signals;
   at least one low-noise amplifier (LNA) configured to amplify the received millimeter wave downlink signals;
   a down-conversion circuit configured to down-convert the amplified millimeter-wave signals to sub-6 GHz signals; and
   a switch configured to route the down-converted signals to a sub-6 GHz processing circuit when the device is in a receive mode and to route sub-6 GHz uplink signals to at least one sub-6 GHz antenna when the device is in a transmit mode.

7. The device of claim 6, wherein the switch electrically disconnects the down-conversion circuit from the sub-6 GHz processing circuit when the device is in a transmit mode.

8. The device of claim 6, wherein the millimeter-wave band signals have frequencies of 24 GHz or higher.

9. The device of claim 6, wherein the down-conversion circuit comprises at least one local oscillator driven by a phase locked loop (PLL).

10. The device of claim 6, wherein the LNA is disabled when the device is in a transmit mode.

11. A wireless communication apparatus, comprising:
   a millimeter wave module comprising:
   a first antenna configured to receive millimeter wave band downlink signals;
   a down-conversion circuit configured to down-convert the millimeter-wave band downlink signals to first sub-6 GHz band signals;
   a first coupling antenna configured to couple the first sub-6 GHz band signals;

a sub-6 GHz module comprising:
  a second coupling antenna, wherein the first sub-6 GHz band signals are transferred from the first coupling antenna to the second coupling antenna; and
  a sub-6 GHz circuit configured to process the first sub-6 GHz band signals;
a directional coupler configured to transfer the first sub-6 GHz band signals from the down-conversion circuit to the first coupling antenna.

12. The wireless communication apparatus of claim 11, wherein the first sub-6 GHz band signals are transferred from the first coupling antenna to the second coupling antenna via electromagnetic coupling.

13. A wireless communication apparatus, comprising:
a sub-6 GHz module comprising:
  a sub-6 GHz circuit configured to generate a first sub-6 GHz band signals;
  a first coupling antenna configured to couple the first sub-6 GHz band signals;
a millimeter-wave module comprising:
  a second coupling antenna, wherein the first sub-6 GHz band signals are transferred from the first coupling antenna to the second coupling antenna; and
  a third antenna configured to transmit the first sub-6 GHz band signals as sub-6 GHz band uplink signals.

14. The wireless communication apparatus of claim 13, further comprising a directional coupler configured to transfer the first sub-6 GHz band signals from the second coupling antenna to the third antenna.

15. The wireless communication apparatus of claim 13, wherein the first sub-6 GHz band signals are transferred from the first coupling antenna to the second coupling antenna via electromagnetic coupling.

16. A method of wireless communication, comprising:
receiving millimeter wave band downlink signals during a receive mode;
amplifying the received millimeter wave band downlink signals;
down-converting the millimeter wave band downlink signals to a first sub-6 GHz signals;
routing the first sub-6 GHz signals to a sub-6 GHz processing circuit;
generating a second sub-6 GHz signals during a transmit mode; and
transmitting the second sub-6 GHz signals as uplink signals during the transmit mode, wherein a switch routes the first sub-6 GHz signals to the sub-6 GHz processing circuit during the receive mode and routes the second sub-6 GHz signals to at least one sub-6 GHz antenna during the transmit mode.

17. The method of claim 16, wherein the switch electrically disconnects a down-conversion circuit from the sub-6 GHz processing circuit during a transmit mode.

* * * * *